United States Patent [19]

Yamauchi et al.

[11] Patent Number: 4,986,598
[45] Date of Patent: Jan. 22, 1991

[54] WIND DEFLECTOR FOR A SUNROOF

[75] Inventors: Takatsugu Yamauchi, Toyota; Kouichi Ito, Kariya, both of Japan

[73] Assignee: Toyota Jidosha Kabushiki Kaisha & Aisin Seiki Co., Ltd., Japan

[21] Appl. No.: 390,502

[22] Filed: Aug. 1, 1989

Related U.S. Application Data

[63] Continuation of Ser. No. 180,766, Apr. 12, 1988, abandoned.

[30] Foreign Application Priority Data

Apr. 24, 1987 [JP] Japan ............................ 62-62489[U]

[51] Int. Cl.⁵ ................................................ B60J 7/22
[52] U.S. Cl. .................................... 296/217; 296/91
[58] Field of Search .................................... 296/217, 91

[56] References Cited

U.S. PATENT DOCUMENTS

| 3,922,032 | 11/1975 | Schaller | 296/217 |
| 4,142,759 | 3/1979 | Bienert | 296/217 |
| 4,165,120 | 8/1979 | Jardin et al. | 296/217 |
| 4,176,876 | 12/1979 | Sorenson | 296/217 |
| 4,380,351 | 4/1983 | Sorenson et al. | 296/217 |
| 4,396,224 | 8/1983 | Hayakawa | 296/217 |
| 4,681,364 | 7/1987 | Bienort et al. | 296/217 |

FOREIGN PATENT DOCUMENTS

| 258135 | 2/1967 | Austria | 296/217 |
| 190022 | 10/1984 | Japan | 296/217 |
| 117222 | 8/1985 | Japan . | |

Primary Examiner—Dennis H. Pedder
Attorney, Agent, or Firm—Oliff & Berridge

[57] ABSTRACT

The present invention provides a wind deflector for a sunroof which has a deflector panel rotatably mounted on a roof through hinges each including a first hinge piece and a second hinge piece pivotally connected to each other through a hinge pin forward of the front end of an opening in a roof, the first and second hinge pieces extending downwardly to a position above a rain gutter under the opening in the roof. As a result, the invention significantly reduce the level of wind throb and wind noise and prevents rainwater from entering into the passenger compartment of a vehicle.

25 Claims, 7 Drawing Sheets

WIND DEFLECTOR FOR A SUNROOF

This is a continuation of application Ser. No. 07/180,766 filed Apr. 12, 1988, abandoned.

BACKGROUND OF THE INVENTION 1. (Field of the Invention)

The present invention relates to a wind deflector for a sunroof which is mounted on a vehicle, and particularly to the mounting structure of a deflector panel.

2. (Description of Related Art)

A wind deflector used for a sunroof is disposed at the front end of an opening in a roof so as to reduce aerial vibration, called wind throb, in the passenger compartment of the vehicle. With such a wind deflector mounted on a sunroof having a slidable panel covering an opening in the roof, when the panel is slid backward, a deflector panel is simultaneously raised. The deflector panel is axially supported by the roof so as to be able to rotate.

Figure 8:
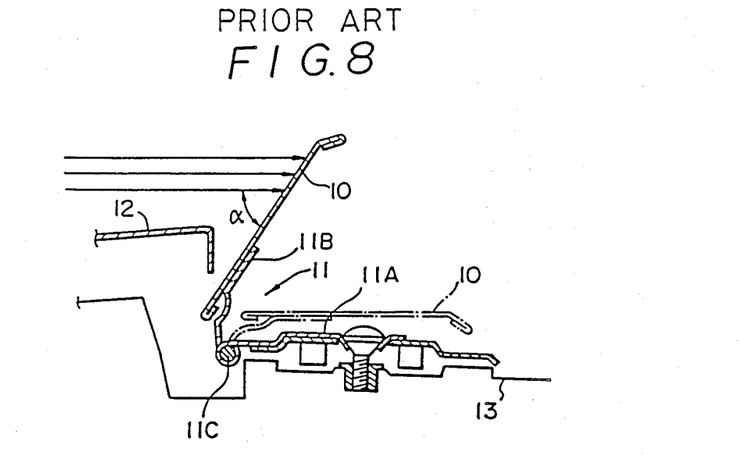
FIG. 8 is a sectional view of a conventional wind deflector as viewed from one side of a vehicle.
Figure 9:
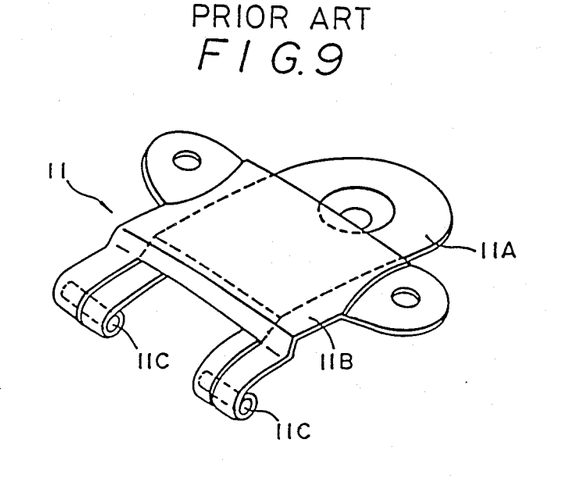
FIG. 9 is a perspective view of the hinge shown in FIG. 8.

FIG. 8 shows an example of this type of conventional wind deflector, in which a wind deflector 10 is mounted on a slidable panel housing 13 disposed on the inside of a fixed roof 12 through hinges 11. Each of the hinges 11 comprises, as shown in FIG. 9, a hinge piece 11A fixed to the slidable panel housing 13 and a hinge piece 11B fixed to the deflector panel. These hinge pieces are axially supported through a hinge pin 11C.

The effect of the deflector panel 10 on wind throb increases as the height of the deflector panel from the fixed roof 12 increases and as the deflector panel is positioned more rearwardly on the vehicle.

However, there is a problem in that the degree of wind noise produced by the deflector panel increases as the height of the above-described projection increases. In addition, the degree of wind noise also increases as the attack angle $\alpha$ of the deflector panel 10 increases.

Therefore, to significantly reduce both wind throb and wind noise:

(1) The rotational center of the deflector panel 10 should be is positioned as far toward the front of the vehicle as possible because the upper end of the deflector panel 10 can be placed at the rear of the vehicle and the attack angle o can be minimized, while necessary height of projection of the deflector panel 10 can be maintained.

(2) The rotational center of the deflector panel 10 should be placed at as high a position as possible on the vehicle because the upper end of the deflector panel 10 can be positioned toward the rear of the vehicle and the space between the deflector panel 10 and the front end of the opening in the roof can be increased, while the necessary height of the upper end can be maintained.

A wind deflector which satisfies these criteria has been proposed in Japanese Utility Model Laid-Open No. 117222/1985. This wind deflector shown in FIG. 10, has hinges 16 axially supported by a fixed roof 12 by a pin 15 through a bracket 14, and a deflector panel 10 fixed to the ends of the hinges 16.

Figure 10:
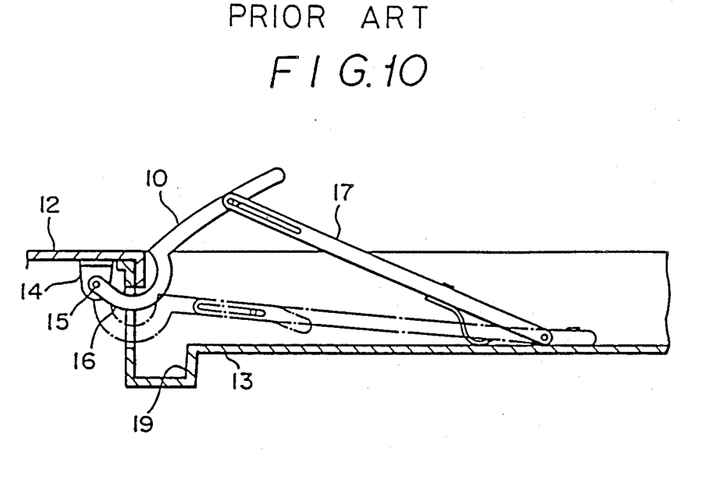
FIG. 10 is a sectional view of another conventional wind deflector as viewed from one side of a vehicle.

The rotation of the deflector panel 10 is controlled by arms 17 which are mounted on a slidable panel housing 13 or housing for a slidable panel provided on the fixed roof 12. Because the mounting of the slidable panel housing 13 to the fixed roof 12 is not always identical for all vehicles, the deflector panel 10 in some cases does not assume the desired precise upright or stowed position and thus the above-described goal of achieving reduction in wind throb and wind noise is, in some instances, not achieved.

Mounting the hinge 16 on the slidable panel housing 13 does not provide a complete solution because the hinges 16 cross a rain gutter 19 formed around the slidable panel housing 13, and rainwater in some cases moves along the hinges 16 and drops into the passenger compartment of the vehicle.

In view of the above problems, it is an object of the present invention to provide a wind deflector for a sunroof which serves to significantly reduce the degree of wind throb and the level of wind noise when the deflector panel is upright and which does not allow rainwater to enter the passenger compartment of the vehicle via hinges.

To this end, the wind deflector of the present invention for a sunroof mounted on a vehicle comprises hinge means each having two first hinge pieces pivotally connected to each other by means of a hinge pin disposed at a position forward of the front end of an opening formed in the roof, each of the two hinge pieces projecting downwardly above a rain gutter provided below the opening; and a deflector panel which is supported by one of the two hinge pieces so that it can be moved between a first position where it is stowed in the roof and a second position where it projects above the roof.

In the present invention configured as described above, since the hinge pins are placed forward of the front end of the opening in the roof, the deflector panel can be mounted in such a manner that wind throb and wind noise are both significantly reduced.

In addition, since the hinge means each comprises the two first hinge pieces which are connected to each other through the hinge pin, the deflector panel can be mounted in a position and manner which minimizes errors produced during mounting or assembly.

Since each of the hinge pieces projects downwardly to a position above the rain gutter, rainwater is not able to enter the passenger compartment of the vehicle.

BRIEF DESCRIPTION OF THE DRAWINGS

FIGS. 1 to 4 show an embodiment of a wind deflector for a sunroof to which the present invention relates:

FIGS. 5 to 7 show a second embodiment of the present invention:

DESCRIPTION OF THE PREFERRED EMBODIMENTS

FIGS. 1 to 4 show a first embodiment of the wind deflector for a sunroof to which the present invention relates.

Figure 2:
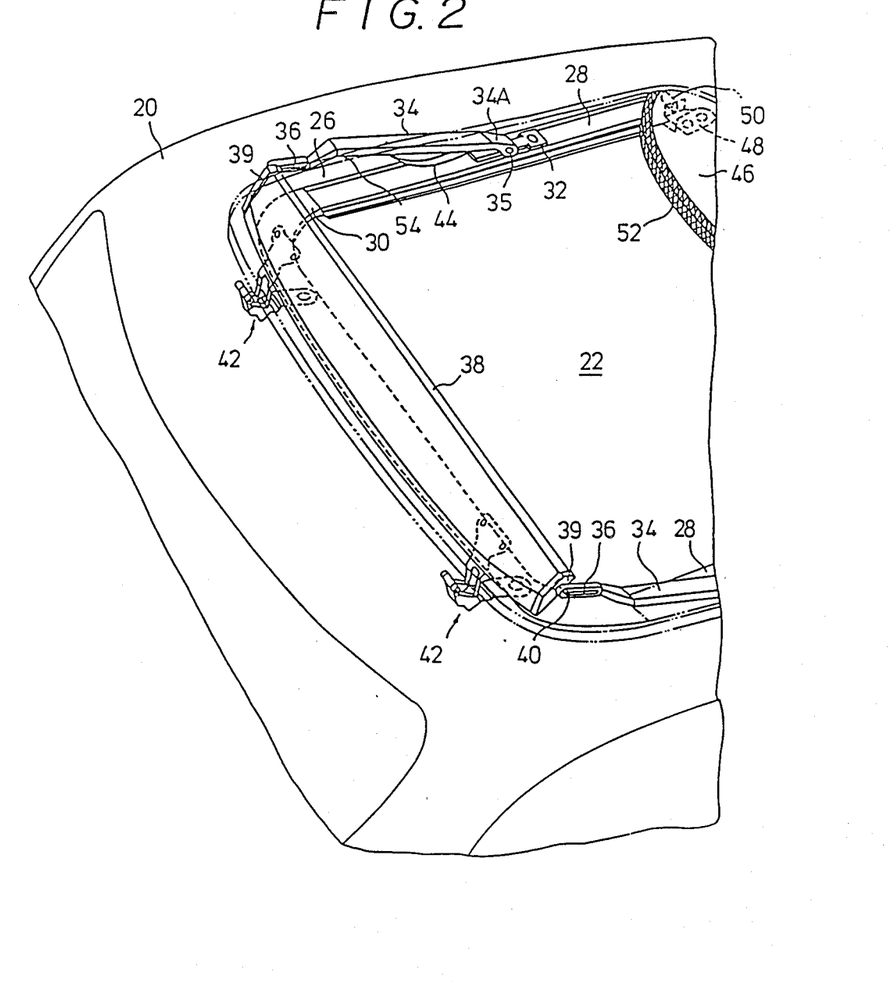
FIG. 2 is a partial perspective view of a roof as viewed from above.

As shown in FIG. 2, a fixed roof 20 has a rectangular roof opening 22 toward the front end thereof, and a slidable panel housing 26 or housing for a slidable panel is provided around the roof opening 22 on the back side of the fixed roof 20. The slidable panel housing 26 extends rearward from the rear end of the roof opening 22. The slidable panel housing 26 is provided with guide rails 28 on its sides and a cable casing 30 connected to the guide rails 28 at its front end.

Figure 3:
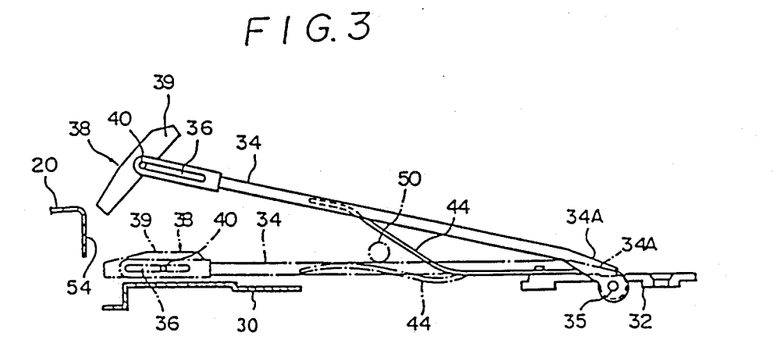
FIG. 3 is a sectional view of a portion around an arm for controlling the rotation of a deflector panel around the hinge center as viewed from one side of the vehicle.

Each of the guide rails 28 is, as shown in FIG. 3, provided with an arm holder 32 by which the rear end of an arm 34 is axially supported through a pin 35. Each of the arms 34 has a guide groove 36 in the form of an elongated opening at the front end of the arm. Each of the arm holders 32 is provided with a flat spring 44 which serves as an urging means for upwardly biasing each of the arms 34 so as to move the front end thereof upwardly when it is brought into riding contact with the back surface of the arm 34. In this way, the arms 34 and the flat springs 44 comprise a rotation means.

A deflector panel 38 is provided on the cable casing 30 through hinges 42 (FIG. 2). The deflector panel 38 has end pieces 39 provided at the left and right ends thereof with pins 40 projecting therefrom.

Figure 1:
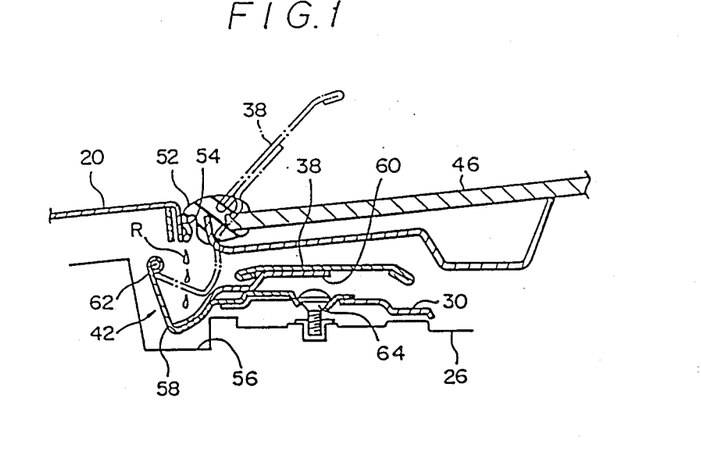
FIG. 1 is a sectional view as viewed from one side of a vehicle.

Each of the pins 40 extends into the guide groove 36 so that the upward movements of the arms 34 urged by the flat springs 44 is limited to a position (upright position) wherein the pins 40 are placed at the front end of the guide grooves 36 (FIGS. 1 and 3). In this way, the guide grooves 36 and the pins 40 comprise a limit means for limiting the range in which the deflector panel 38 can move upwardly. In the above-described state, the deflector panel 38 is in the upright position wherein the top thereof is placed at the highest position. When the front ends of the arms 34 in this state are moved downwardly against the urging force of the flat springs 44, the deflector panel 38 is moved toward the rear ends of the guide grooves 36 while the pins 40 are restricted to move within the guide grooves 36 so that the end of the deflector panel 38 is moved downwardly.

The movement of each of the arms 34 is interlocked with the movement of a slidable roof panel 46 which covers the roof opening 22. The slidable roof panel 46 is provided with front shoes 48 at its left and right ends on the back surface thereof, and a roller 50 is axially supported by each of the front shoes 48. The sliding roof panel 46 is stowed under the fixed roof 20 in the rear of the roof opening 22 when the roof opening is opened. In this stowed position, the movement of each cf the arms 34 s limited by the above-described engagement between the arms 34 and the deflector panel 38.

When the slidable roof panel 46 is moved forward from the stowed position, the rollers 50 move along the guide rail 28 and run onto the arms 34 from an intermediate point during the closing movement. Since each arm 34 has an inclined upper surface 34A at its rear end, when each of the rollers 50 runs onto the inclined surface 34A, the front end of each arm 34 is moved downward against the urging force of the flat spring 44. After each of the rollers 50 has passed over the inclined surface 34A, each of the arms 34 is kept in a substantially horizontal state (FIG. 3 dotted line position) so that it is hardly moved thereafter.

In addition, when the slidable roof panel 46 is moved rearwardly from the horizontal state of each of the arms 34 and each of the rollers 50 reaches the inclined surface 34A, of each arm 34 is urged upwardly by the flat spring 44 so that the front end thereof starts to move upward.

A weather strip 52 is provided around the sliding roof panel 46 so as to be brought into press contact with a flange 54 of the roof opening 22. A rain gutter 56 is formed on the slidable panel housing 26 under the contact position between the flange 54 and the weather strip 52 (refer to FIG. 1).

Figure 4:
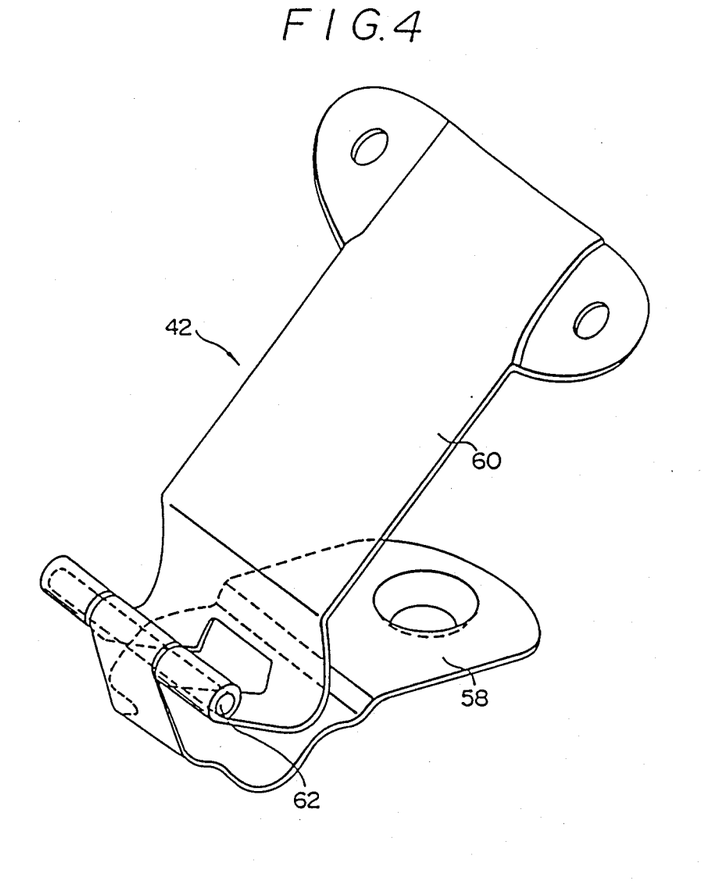
FIG. 4 is a perspective view of a hinge.

Each of the hinges 42 comprises, as shown in FIG. 4, a first hinge piece 58 and a second hinge piece 60 which are pivotally connected to each other through a hinge pin 62. The hinge pins are, as shown in FIG. 1, placed in positions which are above the rain gutter 56, in front of the flange 54, and under the fixed roof 20 so that their axes are in the transverse direction of the vehicle. Each of the first hinge piece 58 extends rearward from the hinge pin 62 and is secured to the slidable panel housing 26 together with the cable casing 30 by a screw 64 to the rear of the flange 54. Each of the first hinge pieces 58 obliquely extends downward from the hinge pin 62 and is bent at a position at substantially the center of the rain gutter in the longitudinal direction of the vehicle so as to obliquely extend upward from the bend. Therefore, the first hinge pieces 58 project downwardly above the rain gutter 56.

The deflector panel 38 is secured to the ends of the second hinge pieces 60 by rivets (not shown). The deflector panel 38 is in the stowed state when the slidable roof panel 46 is moved to its forward-most position. In this position, the second hinge pieces 60 are respectively laid on the first hinge pieces 58 above the rain gutter 58 (FIG. 1).

The function of the first embodiment is described below.

In the position wherein the sliding roof panel 46 is closed, as shown by the dotted lines in FIG. 3, the rollers 50 are riding on the arms 34 which are kept in substantially horizontal position against the urging force of the flat springs 44. Therefore, as shown by the dotted lines in FIG. 3, the deflector panel 38 s stowed in a substantially horizontal position.

In this position, the hinges 42 assume a position wherein the first hinge pieces 58 and the second hinge pieces 60 respectively overlap each other and project downward above the rain gutter 56, as shown by the solid lines in FIG. 1. When rainwater enters from the front end of the opening as a result of strong fluid pressure, water droplets R flow into the rain gutter 56. The water droplets R falling onto the hinges 42 are collected in the bent portion at the bottom of each of the hinges 42 and then flow into the rain gutter 56. Therefore, no water droplets R move along the hinges 42 and flow into the passenger compartment of the vehicle.

When the slidable roof panel 46 is opened, if any rainwater has collected between the flange 54 and the front end of the weather strip 52, water droplets R will flow into the rain gutter 56. The water droplets R falling onto the hinges 42 are collected in the bent portion at the bottom of each of the hinges 42 and then flow into the gutter 56. Therefore, in this case, no water droplets move along the hinges 42 and flow into the passenger compartment of a vehicle.

If the slidable roof panel 46 begins to open, since the arms 34 of the deflector panel do not move upwardly until the rollers 50 reach the inclined surfaces 34A, the hinges 42 remain in the above-described position for a period of time.

When the rollers 50 reach the inclined surfaces 34A of the arms 34, each of the arms 34 is urged by the flat spring 44 so as to begin to move upwardly. When the pins 40 are raised by the movements of the arms 34 while being guided within the guide grooves 36, the deflector panel 38 is rotated around the hinge pins 62 serving as fulcrums so as to assume the upright position. In this position, the pins 40 are at the front ends of the guide grooves 36 so that the arms 34 and the deflector panel 38 are inhibited from further movement.

Since the deflector panel 38 in the upright position is at a small attack angle $\alpha$ with the general air flow direction, the top thereof located toward the rear of the vehicle, the height of the projecting top is greater than that of the deflector panel 10, (FIG. 8) sufficient spacing is provided between the deflector panel 38 and the flange 54.

When the slidable roof panel 46 is closed, the rollers 50 roll on the guide rails 28 and ride onto the inclined surfaces 34A of the arms 34 so as to move the front ends of the arms 34 downwardly against the urging force of the flat springs 44. When the pins 40 are guided by the guide grooves 36 by the movements of the arms 34 and are moved toward the rear ends of the guide grooves 36, the top of the deflector panel 38 is moved downwardly by the rotation of the hinge pieces 60 around the hinge pins 62, serving as fulcrums, so that the deflector panel 38 is in the stowed position.

Figure 5:
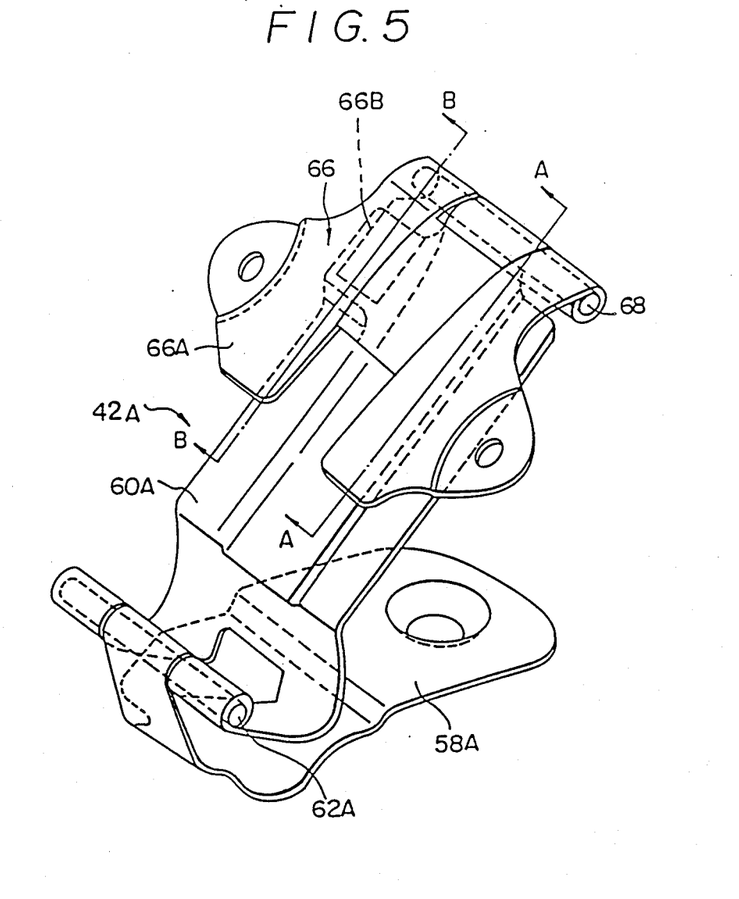
FIG. 5 is a perspective view of a hinge.
Figure 6:
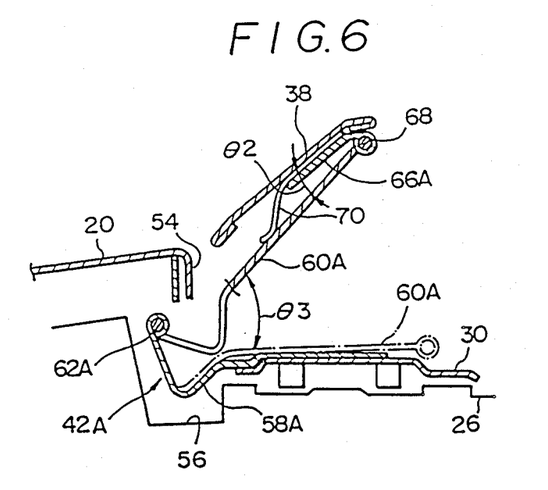
FIG. 6 is a sectional view of an embodiment which corresponds to a perspective view taken along the line A—A of FIG. 5 as viewed from one side of a vehicle.
Figure 7:
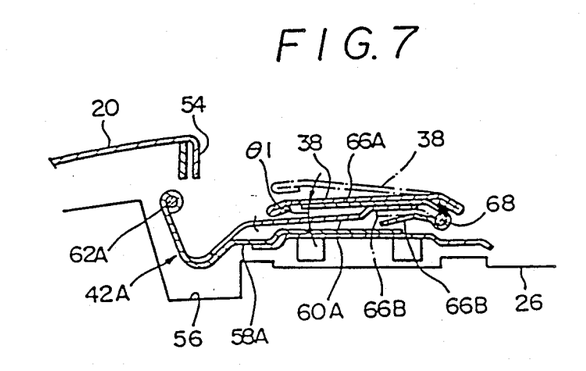
FIG. 7 is a sectional view of an embodiment which corresponds to a perspective view taken along the line B—B of FIG. 5 as viewed from one side of a vehicle.

FIGS. 5 to 7 show a second embodiment of the present invention.

In the second embodiment, as shown in FIG. 5, each of hinges 42A comprises a first hinge piece 58A and a second hinge piece 60A which are pivotally connected to each other through a first hinge pin 62A, and a third hinge piece 66 which is pivotally connected to the second hinge piece 60A through a second hinge pin 68. Each of the hinges 62A is the same as that of the first embodiment in that the first hinge piece 58A and the second hinge piece 60A are pivotally connected to each other through the first hinge pin 62A. The relation of the hinges to the rain gutter in the second embodiment is the same as that in the first embodiment.

Each of the third hinge pieces 66 has a mounting portion 66A on the upper surface of the second hinge piece 60A and an integral control portion 66B on the back surface of the second hinge piece 60A. As shown in FIG. 6, flat springs 70 and the deflector panel 38 are fixed to the mounting portions 66A. The free end of each of the flat springs 70 is brought into pressure contact with the second hinge piece 60A and urges the end of each of the mounting portions 66A so as to separate it from the second hinge piece 60A. As shown by the dotted lines in FIG. 7, each of the control portions 668 is brought into pressure contact with the second hinge piece 60A so as to control the rotation angle of the mounting portion 66A.

The deflector panel 38 is rotated by the rotations of the arms 34 interlocking the movement of the slidable roof panel 46 in the same manner as the first embodiment.

In this embodiment, the end of each of the mounting portions 66A is brought close to the second hinge piece 60A against the urging force of each of the flat springs 70 in the stowed position of the deflector panel 38 shown in FIG. 7. However, when the deflector panel 38 is in the upright position shown in FIG. 6, i.e., in the position wherein the roof is open, the deflector panel 38 is urged by the flat springs 70 and moves away from the second hinge pieces 60A.

Consequently, an included angle $\theta1$ between each of the mounting portions 66A and each of the second hinge pieces 60A shown in FIG. 7 is increased to an included angle $\theta2$ shown in FIG. 6. Although the second hinge pieces 60A rotate from the position shown in FIG. 7 for an angle $\theta3$, as shown in FIG. 6, the rotation angle of the deflector panel 38 is smaller and reduced to $\theta3 - (\theta2 - \theta1)$. Therefore, the attack angle of the deflector panel 38 can be reduced even though the height of the top thereof can remain the same.

As described above, the wind deflector for a sunroof of the present invention can significantly reduce the amount of wind throb and the level of wind noise in the upright position of the deflector panel without allowing rainwater to enter the passenger compartment of the vehicle.

What is claimed is:

1. A wind deflector for a sunroof mounted on a roof of a vehicle comprising:
   a housing of a slidable panel provided along a periphery of an opening of said roof;
   a rain gutter disposed at a front end portion of said housing and positioned directly under a forward edge of said opening of said roof;
   hinge means comprising first and second hinge pieces, said first hinge piece being non-rotatably fixed to said housing at a position rearward from said rain gutter, with a front end portion of said first hinge piece being positioned forward of said forward edge of said opening of said roof, and a front end portion of said second hinge piece being connected pivotally through a pivot portion with said front end portion of said first hinge piece, the pivot portion located at a position higher than and displaced forwardly from a rear end portion of the first hinge piece and being disposed in a position directly above said rain gutter below said roof; and
   a deflector panel provided at a rear end portion of said second hinge piece and being movable between a first position in which said deflector is stowed below the level of said roof and a second position in which said deflector projects upwardly from said roof.

2. A wind deflector for a sunroof according to claim 1, wherein said hinge means further comprises a third hinge piece supported by said second hinge piece through a pivot, and said deflector panel is supported by said third hinge piece.

3. A wind deflector for a sunroof according to claim 2, further comprising means for rotating said third hinge piece relative to said second hinge piece so that said second and third hinge pieces are angled at a given angle when said opening is open.

4. A wind deflector for a sunroof according to claim 3, wherein said rotating means comprises means for urging said third hinge piece so as to separate said third hinge piece from said second hinge piece, and means for limiting the rotation of said third hinge piece relative to said second hinge piece to said given angle.

5. A wind deflector for a sunroof which is mounted on a roof of a vehicle and which has a deflector panel rotatably mounted on said roof through hinges disposed on a housing of a slidable panel provided along a periphery of an opening of said roof, wherein said hinges comprise a first hinge piece and a second hinge piece pivotally connected to each other through a pivot located at forward portions of said first and second hinge pieces, said pivot being forward of a front end of said opening of said roof at a point between said roof and said housing of said vehicle, forward portions of forward portions of said first and second hinge pieces disposed in a position directly above a rain gutter that is directly under said front end of said opening of said roof, and one of said hinge pieces being secured on said housing at a position rearward of said rain gutter, said one hinge piece extending below said pivot.

6. A wind deflector for a sunroof which is mounted on a roof of a vehicle and which has a deflector panel rotatably mounted on said roof through hinges disposed on a housing of a slidable panel provided along a periphery of an opening of said roof, wherein said deflector panel has a pin at least at one side of end portions thereof and having means for rotating said deflector panel between a stowed position in which said deflector panel is stowed below said roof and an upright position in which said deflector panel projects upwardly from said opening, said rotating means comprising an arm which has a slot at one end to which said pin of said deflector panel is engaged and means for urging said arm when said opening is open so as to rotate said deflector panel from said stowed position to said upright position, and wherein said hinges comprise a first hinge piece and a second hinge piece pivotally connected to each other through a pivot at forward portions of said first and second hinge pieces, said pivot being forward of a front end of said opening of said roof at a point between said roof and said housing of said vehicle, forward portions of said first and said second hinge pieces disposed in a position directly above a rain gutter which is directly under said front end of said opening of said roof, and one of said hinge pieces being secured on said housing at a position rearward of said rain gutter, said one hinge piece extending below said pivot, the other hinge piece supporting said deflector panel.

7. A wind deflector for a sunroof according to claim 6 wherein said rotating means is provided between said arm and said deflector panel to limit the rotation range of said deflector panel to an angle between said stowed position and said upright position.

8. A wind deflector for a sunroof according to claim 7, wherein said hinges each further comprises a third hinge piece pivotally connected to said second hinge piece, and said deflector is supported by said third hinge pieces.

9. A wind deflector for a sunroof according to claim 8, further comprising second means for rotating said third hinge pieces relative to said second hinge pieces so that said second hinge pieces and said third hinge pieces are at given angles when said opening is opened.

10. A wind deflector for a sunroof applied to a sunroof having an opening in a roof of a vehicle and which can be opened or closed by a slidable roof panel along said roof, comprising:
a frame for supporting said slidable roof panel provided along a periphery of said opening;
hinges comprising a first hinge pin forward of a front end of said opening in said roof of said vehicle, a first hinge piece connected to said first hinge pin and fixed to said frame at a position rearward of said first hinge pin, said first hinge pin being located at a position higher than and displaced forwardly from a rear end portion of said first hinge piece, and a second hinge piece pivotally supported by said first hinge pin so as to be able to rotate relative to said first hinge piece around said first hinge pin, said first and second hinge pieces being disposed in a position directly above a rain gutter that is directly under said front end of said opening;
a deflector panel supported by said second hinge pieces so as to be able to rotate around said first hinge pins;
arms each of which are engaged with said deflector panel at one end thereof; and
a spring for urging said arms when said opening is opened so as to rotate said deflector panel from said stowed position in which said deflector panel is stowed to said upright position in which said deflector panel projects upwardly from said opening.

11. A wind deflector for a sunroof according to claim 10, further comprising limit means between said arms and said deflector panel so as to limit the rotation range of said deflector panel between said stowed position and said upright position, said limit means comprising projections on one of said deflector panel and said arms, and said limit means further comprising elongated holes on the other one of said deflector panel and said arms so as to receive said projections and allow said projections to move for given amounts along the elongated holes.

12. A wind deflector for a sunroof according to claim 10, wherein said hinges each comprise a third hinge piece pivotally connected to said second hinge piece through a second hinge pin, and said deflector panel is fixed to said third hinge pieces.

13. A wind deflector for a sunroof according to claim 12, further comprising means for rotating said third hinge pieces relative to said second hinge pieces when said opening is opened so that said second hinge pieces and said third hinge pieces are at given angles.

14. A wind deflector for a sunroof according to claim 13, wherein said rotating means each comprises a spring for urging said third hinge piece so as to separate a third hinge piece from said second hinge piece and a limit means for limiting the rotation of said third hinge piece relative to said second hinge piece to said given angle.

15. A wind deflector for a sunroof mounted on a roof of a vehicle comprising:
a deflector panel;
hinge means comprising a first and second hinge piece pivotally connected to each other through a pivot that is forward of an opening in a roof, said first and second hinge pieces being disposed in a position above a rain gutter under said opening, and a third hinge piece supported by one of said first and second hinge pieces at an end of said one hinge piece opposite to said pivot, said deflector panel supported by said third hinge piece;
means for rotating said third hinge piece relative to said one of said first and second hinge pieces so that said third hinge piece and one of said first and second hinge pieces are at a given angle when said opening is open;
said deflector panel supported by one of said first and second hinge pieces and rotatable between a first position in which said deflector is stowed and a second position in which said deflector projects upwardly from said roof.

16. A wind deflector for a sunroof according to claim 15, wherein said rotating means comprises means for urging said third hinge piece so as to separate said third hinge piece from one of said first and second hinge pieces, and means for limiting the rotation of said third hinge piece relative to said one of said first and second hinge pieces to said given angle.

17. A wind deflector for a sunroof which is mounted on a roof of a vehicle and which has a deflector panel rotatably mounted on a roof through hinges, wherein said hinges comprises a first hinge piece and a second hinge piece pivotally connected to each other through a pivot that is forward of the front end of an opening in said roof of said vehicle, said first and said second hinge pieces disposed at a position above a rain gutter under said opening, said first hinge piece fixed to said roof and said second hinge piece supporting said wind deflector panel; and means for rotating said deflector panel between a stowed position in which said deflector panel is stowed and an upright position in which said deflector panel projects upwardly from said opening, said deflector panel having a pin at least at one side of end portions thereof;

said rotating means comprising an arm which has a slot at one end to which said pin of said deflector panel is engaged and means for urging said arm when said opening is open so as to rotate said deflector panel from said stowed position to said upright position, said rotating means provided between said arm and said deflector panel to limit the rotation range of said deflector panel to an angle between said stowed position and said upright position; and a third hinge piece pivotally connected to said second hinge piece, said deflector panel supported by said third hinge pieces.

18. A wind deflector for a sunroof according to claim 17, further comprising second means for rotating said third hinge pieces relative to said second hinge pieces so that said second hinge pieces and said third hinge pieces are at given angles when said opening is opened.

19. A wind deflector for a sunroof according to claim 18, wherein said second rotating means each comprises second urging means for rotating said third hinge piece so as to separate said third hinge piece from said second hinge piece, and a second limit means for limiting the rotation of said third hinge piece relative to said second hinge piece to said given angle.

20. A wind deflector fore a sunroof applied to a sunroof having an opening in a roof of a vehicle and which can be opened or closed by sliding a movable roof panel along said roof, comprising:

a deflector panel;

hinges each comprising a first hinge pin forward of the front end of said opening of said vehicle, a first hinge piece connected to said first hinge pin and fixed to said roof, and a second hinge piece pivotally supported by said first hinge pin so as to be able to rotate relative to said first hinge piece around said front hinge pin, said first and second hinge pieces being disposed in a position above a rain gutter under said opening, said hinges each comprising a third hinge piece pivotally connected to said second hinge piece through a second hinge pin, said deflector panel fixed to said third hinge pieces;

said deflector panel supported by said second hinge pieces so as to be able to rotate around said first hinge pins;

arms each of which are engaged with said deflector panel at one end thereof;

a spring for urging said arms when said opening is opened so as to rotate said deflector panel from said stowed position in which said deflector panel is stowed to said upright position in which said deflector panel projects upwardly from said opening; and limit means between said arms and said deflector panel so as to limit the rotation range of said deflector panel between said stowed position and said upright position, said limit means comprising projections on one of said deflector panel and said arms, and said limit means further comprising an elongated hole on the other one of said deflector panel and said arms so as to receive said projections and allow said projections to move for given amounts along the elongated holes.

21. A wind deflector for a sunroof according to claim 20, further comprising means for rotating said third hinge pieces relative to said second hinge pieces when said opening is opened so that said second hinge pieces and said third hinge pieces are at given angles.

22. A wind deflector for a sunroof according to claim 21, wherein said rotating means each comprises a spring for urging said third hinge piece so as to separate said third hinge piece from said second hinge piece and a limit means for limiting rotation of said third hinge piece relative to said second hinge piece to said given angle.

23. A wind deflector for a sunroof mounted on a roof of a vehicle comprising:

a housing of a slidable panel provided along a periphery of an opening of said roof;

a rain gutter disposed at a front end portion of said housing and positioned directly under a forward edge of said opening of said roof;

hinge means comprising first and second hinge pieces, said first hinge piece being fixed to said housing at a position rearward from said rain gutter, with a front end portion of said first hinge piece being positioned forward of said forward edge of said opening of said roof, and a front end portion of said second hinge piece being connected pivotally through a pivot portion with said front end portion of said first hinge piece, the pivot portion being located at a position higher than and displaced forwardly from a rear end portion of the first hinge piece and being disposed in a position directly above said rain gutter below said roof;

a deflector panel provided at a rear end portion of said second hinge piece and being movable between a first position in which said deflector is stowed below said roof and a second position in which said deflector projects upwardly from said roof, said deflector panel having a pin at a side end portion thereof; and means for rotating said deflector panel from said first position to said second position when said opening is open, comprising an arm which has a slot at one end to which said pin of said deflector panel is engaged and means for urging said arm so as to rotate said deflector panel from said first position to said second position.

24. A wind deflector for a sunroof according to claim 23, wherein said rotating means limit the range of rotation of said deflector panel to an angle of rotation between said first position and said second position, said limit means being between said arm and said deflector panel.

25. A wind deflector for a sunroof according to claim 9, wherein said second rotating means each comprises second urging means for rotating said third hinge piece so as to separate it from said second hinge piece, and a second limit means for limiting the rotation of said third hinge piece relative to said second hinge piece to said given angle.

* * * * *